US006630083B1

(12) United States Patent
Nunez et al.

(10) Patent No.: US 6,630,083 B1
(45) Date of Patent: Oct. 7, 2003

(54) METHODS AND COMPOSITIONS FOR THE MANUFACTURE OF OPHTHALMIC LENSES

(75) Inventors: Ivan Nunez, Roanoke, VA (US); Venkat Sekharipuram, Roanoke, VA (US); Elbert Basham, Roanoke, VA (US); Eric Dogan, Roanoke, VA (US); Michele Alton, Vinton, VA (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 09/468,973

(22) Filed: Dec. 21, 1999

(51) Int. Cl.⁷ ................................................. B29D 11/00
(52) U.S. Cl. ........................ 264/1.38; 264/1.36; 264/1.7
(58) Field of Search .................................. 264/1.1, 1.36, 264/1.38, 1.7, 335; 425/808

(56) References Cited

U.S. PATENT DOCUMENTS

| 4,313,969 A | | 2/1982 | Matthews et al. |
| 4,410,562 A | | 10/1983 | Nemoto et al. |
| 4,411,931 A | | 10/1983 | Duong |
| 4,421,784 A | | 12/1983 | Troue |
| 4,457,880 A | | 7/1984 | Neefe |
| 4,483,884 A | | 11/1984 | Troue |
| 4,485,123 A | | 11/1984 | Troue |
| 4,497,754 A | | 2/1985 | Padoan |
| 4,919,850 A | | 4/1990 | Blum et al. |
| 4,985,186 A | * | 1/1991 | Nose et al. ................. 264/1.38 |
| 5,028,358 A | | 7/1991 | Blum |
| 5,147,585 A | | 9/1992 | Blum |
| 5,178,800 A | | 1/1993 | Blum |
| 5,300,331 A | | 4/1994 | Schaeffer |
| 5,308,886 A | | 5/1994 | Masuhara et al. |
| 5,415,816 A | | 5/1995 | Buazza et al. |
| 5,422,046 A | * | 6/1995 | Tarshiani et al. ............ 264/1.1 |
| 5,470,892 A | | 11/1995 | Gupta et al. |
| 5,512,371 A | | 4/1996 | Gupta et al. |
| 5,529,728 A | | 6/1996 | Buazza et al. |
| 5,593,736 A | | 1/1997 | Cowen et al. |
| 5,702,819 A | | 12/1997 | Gupta et al. |
| 5,888,617 A | | 3/1999 | Roth |
| 5,914,174 A | | 6/1999 | Gupta et al. |

FOREIGN PATENT DOCUMENTS

| EP | 0 226 123 A2 | | 6/1987 |
| EP | 0 478 794 B1 | | 11/1995 |
| EP | 0 686 483 A2 | | 12/1995 |
| EP | 0 686 484 A2 | | 12/1995 |
| EP | 0 691 550 A2 | | 1/1996 |
| EP | 0 549 610 B1 | | 5/1996 |
| EP | 0 586 380 B1 | | 5/1997 |
| JP | 61-283509 | * | 12/1986 |
| WO | WO 97/09170 | | 3/1997 |
| WO | WO 97/27223 | | 7/1997 |
| WO | WO 97/39880 | | 10/1997 |
| WO | WO 98/20373 | | 5/1998 |
| WO | WO 98/50443 | | 11/1998 |
| WO | WO 99/06887 | | 2/1999 |

* cited by examiner

*Primary Examiner*—Mathieu D. Vargot
(74) *Attorney, Agent, or Firm*—Lois A. Gianneschi

(57) ABSTRACT

The present invention provides methods and compositions for producing lenses by casting. The processes utilize a two-stage, ultraviolet cure to provide a fast and reliable method for producing ophthalmic lenses.

30 Claims, No Drawings

METHODS AND COMPOSITIONS FOR THE MANUFACTURE OF OPHTHALMIC LENSES

FIELD OF THE INVENTION

The present invention relates to ophthalmic lenses. In particular, the invention provides methods and compositions for producing lenses by casting.

BACKGROUND OF THE INVENTION

The use of spectacle lenses for the correction of ametropia is well known. For example, multifocal lenses, such as progressive addition lenses, are used for the treatment of presbyopia. A number of methods are known for producing ophthalmic lenses. These methods include casting semi-finished lens blanks and subsequently polishing and grinding the blanks to form lenses, casting of whole lenses, and casting of a surface onto an optical preform to form a lens.

The casting of a surface onto an optical preform is advantageous in that it can reduce the number of molds required to produce a full prescriptive range of lenses. However, the known surface casting processes lack the efficiency necessary for use of the processes in the mass production of lenses. More specifically, the known processes require cure times of 30 minutes or more to achieve a cured resin layer free of optical distortions, defects, or voids. Additionally, known resins for use in surface casting processes cannot provide both a high refractive index on cure and a low viscosity at room temperature. Therefore, the invention provides methods and compositions for casting surfaces onto preforms to form lenses that attempt to overcome these disadvantages.

DESCRIPTION OF THE INVENTION AND ITS PREFERRED EMBODIMENTS

The present invention provides methods and compositions for producing ophthalmic lenses, including multifocal spectacle lenses such as progressive addition lenses, as well as lenses produced using the methods and compositions of the invention. The invention, provides a fast and reliable method for producing ophthalmic lenses.

In one embodiment, the invention provides a method for producing an ophthalmic lens comprising, consisting essentially of, and consisting of the steps of: a.) exposing to low intensity ultraviolet light a mold assembly and a surface-forming effective amount of a resin comprising, consisting essentially of, and consisting of reactive groups, the low intensity UV light exposure carried out under conditions suitable to convert at least about 50 percent or more of the resin's reactive groups; and b.) exposing, subsequently, the resin to high intensity UV light under conditions suitable to substantially complete through curing of the resin. In another embodiment, the invention provides lenses produced by this method.

By "ophthalmic lens" is meant a contact lens, intraocular lens, spectacle lens and the like. Preferably, the lens formed by the method of the invention is a spectacle lens, more preferably a multifocal, most preferably a progressive addition lens. By "mold assembly" is meant one or more mold halves, an optical preform, or combinations thereof. By "optical preform" or "preform" is meant a shaped, optically transparent article capable of refracting light, which article is suitable for use in producing a spectacle lens. By "resin" is meant at least one monofunctional monomer, one or more polyfunctional monomers, and one or more initiators. By "convert" is meant that the reactive groups are incorporated into the polymer being formed.

In the first step of the method of the invention, a mold assembly is exposed to low intensity ultraviolet light. For purposes of the invention, low intensity UV light is UV light with an intensity of about 0.5 to about 50, preferably about 1 to about 5 mW/cm$^2$. Suitable wavelengths for carrying out this step of the process are about 300 to about 450, preferably about 360 to about 400 nm. The low intensity exposure is carried out under conditions of wavelength and time suitable to convert at least about 50 percent or more of the resin's reactive groups and, preferably, while maintaining the rate of polymerization as low as possible, which rate is a rate at which undesirable shrinkage induced defects are avoided. One ordinarily skilled in the art will recognize that this rate will depend on a number of factors including, without limitation, the resin used and the thickness of the resin layer. The maintenance of the low polymerization rate is achieved through the use of the low intensity UV light and, optionally, one or more of using a photoinitiator concentration of about 1 weight percent or less based on the total resin weight, incorporation of periods of non-exposure into the low intensity exposure cycle, and combinations thereof.

The time for the low intensity exposure will depend on the resin selected for casting onto the preform, the type and amount of initiator used, resin viscosity, the nature of the reactive groups, the thickness of the resin layer to be cast, and the intensity of the UV light. Generally, the total exposure time will be about 5 seconds to about 300 seconds, preferably about 60 seconds to about 120 seconds.

The low intensity exposure preferably is carried out in one step. However, some lens assemblies may require that the low intensity exposure be carried out in two or more steps using periods of non-exposure to the UV light of about 5 to about 60 seconds between each low intensity exposure. Preferably, periods of exposure of about 30 to about 60 seconds are alternated with non-exposure periods of about 5 to about 60 seconds.

Subsequent to the termination of the low intensity exposure, the mold assembly is exposed to high intensity UV light under conditions suitable to complete through cure of the resin. The intensity of the UV light for this step may be about 50 to about 2000, preferably 500 to about 1500 mW/cm$^2$. The wavelength at which the exposure is carried out may be, and preferably is, the same as that used to carry out the low intensity exposure. The same factors determinative for low intensity exposure time are determinative for the high intensity exposure time. Generally, the exposure time will be about 3 seconds to about 60 seconds, preferably about 5 seconds to about 15 seconds. The high intensity exposure may, and preferably is, carried out as a single, continuous exposure. However, the high intensity exposure also may be carried out using alternating periods of UV exposure and non-exposure periods.

It is a discovery of the invention that the disclosed cure process using low and high intensity exposure permits production of a cast layer substantially free of distortions, defects and voids using a total UV exposure, both low and high intensity, time of about 150 or less seconds. Preferably the total exposure time is about 130 seconds or less.

The low and high intensity polymerization steps may be carried out at ambient temperature and atmospheric pressure. Preferably, the resin is hot-coated and the polymerization process is carried out at about the glass transition temperature, or Tg, of the cured resin or above. By "hot-coated" is meant that the resin is heated before it is cast to about its Tg. Heating may be accomplished by any convenient means including, without limitation, use of an oven, heat circulator, or combination thereof. Polymerization at the preferred temperature is also achieved by any convenient means including, without limitation, maintaining the cure chamber at the preferred temperature by use of forced air.

The low and high intensity UV exposures may be carried out in any fashion that permits the even distribution of the light through the mold assembly. A convenient and preferred mode is to expose the mold assembly to the UV light by placing the UV light source beneath the mold assembly. Sources of low intensity UV light include, without limitation, mercury and xenon arc lamps, fluorescent-type bulbs, or the like, and combinations thereof. High intensity UV light sources include, without limitation, mercury, xenon, and mercury-xenon arc lamps, FUSION™ microwave-ignited lamps, or the like, and combinations thereof Suitable sources for the UV light used in the invention are commercially available.

The mold half or halves used may be made of any suitable material including, without limitation, glass or plastic. The optical preforms used in the mold assemblies may be made of any suitable materials including, without limitation, polycarbonates, such as bisphenol A polycarbonates, allyl diglycol carbonates, such as diethylene glycol bisallyl carbonate (CR-39™), allylic esters, such as triallyl cyanurate, triallyl phosphate and triallyl citrate, acrylic esters, acrylates, methacrylates, such as methyl- ethyl- and butyl methacrylates and acrylates, styrenics, polyesters, poly ether phosphine oxides, and the like and combinations thereof. The preform may be produced by any convenient means including, without limitation, injection molding, injection-compression molding, thermoforming, casting, or the like.

In practice of the method of the invention, the rein may contain any mono- or polyfunctional monomer suitable for use for casting a surface onto an optical preform and containing the requisite reactive groups. The reactive groups required to be contained in the monomers used in the invention are photopolymerizable groups including, without limitation, free-radical polymerizable, photoanionic polymerizable, photocationic polymerizable groups, and the like, and combinations thereof. Preferably, resins with free-radical polymerizable groups are used. Examples of such groups include, without limitation, substituted vinyl and allyl groups including, without limitation, acrylate, methacrylate, styryl, allylic esters, vinylic esters, allyl carbonates, allyl alkyl ethers, allyl aryl ethers and the like, and combinations thereof. As another alternative, the reactive groups may be photocationically reactive groups, such as an epoxide, aliphatic cyclic ether, vinyl alkyl and vinyl aryl ethers, styrenic groups, and the like and combinations thereof. As still another alternative, photoanionic reactive groups may be used including, without limitation, acrylate, methacrylate, epoxide, styryl, and the like, and combinations thereof.

Suitable mono- and polyfunctional monomers include, without limitation, hose disclosed in U.S. Pat. No. 5,470,892, incorporated in its entirety herein by reference. Additional suitable monomers include, without limitation, allyl and bis(allyl) carbonates, such as diethylene glycol bis(allyl) carbonate, bisphenol A diallyl carbonate, and the like, acrylic acid, multi-functional acrylates and methacrylates, such as ethylene glycol diacrylate, tetraethylene glycol diacrylate, tripropylene glycol diacrylate, trimethylolpropane triacrylate, tetrahydrofurfuryl methacrylate, tetrahydrofurfuryl acrylate, hexanediolmethacrylate, methyl methacrylate, butyl methacrylate, propyl methacrylate, pentaerythritol tetraacrylate, urethane acrylates and methacrylates, styrene and styrene derivatives such as divinyl benzene, 4-vinyl anisole, various esters or maleic and itaconic acids, methacrylic and acrylic anhydrides and the like, and combinations thereof. Such monomers are commercially available or methods for their production are known.

It is another discovery of the invention that certain monomers are particularly useful in forming lenses with high refractive indices. By "high refractive index" is meant a refractive index on curing of about 1.54 or greater, preferably of about 1.56 or greater. The monomers useful in forming high refractive index resins are bisphenol A, diacrylates and dimethacrylates, ethoxylated bisphenol A diacrylates and dimethacrylates, acrylate and methacrylate esters of diglycidyl bisphenol A, epoxy acrylates and methacrylates, acrylates and methacrylates of tetrabromo bisphenol A, acrylates and methacrylates of bisphenol S, acrylate and methacrylate esters of diglycidyl tetrabromo bisphenol A, acrylate and methacrylate esters of diglycidyl tetrabromo bisphenol S, acrylate and methacrylate esters of tetrahydrofuran, and the like. The monomers may be used alone or in combination with one or more of the following: epoxy acrylates and methacrylates; ethoxylated phenoxy acrylates and methacrylates; isobornyl acrylates and methacrylates; divinyl benzene; benzyl acrylates and methacrylates; polyethylene glycol diacrylates and dimethacrylates; N-vinyl carbazole, and the like.

In formulations using ethoxylated bisphenol A, the weight percentages of the ethoxylated bisphenol A component may be about 1 to about 99, preferably about 4 to about 80, more preferably about 20 to about 75 weight percent of the total weight of the resin composition. The ethoxylated bisphenol A component may be a mixture of at least two ethoxylated bisphenol A components, the first component of about 2 to about 4 and the second component of about 9 to about 11 mole, preferably about 3 and about 10 mole, respectively. The weight percentages for the first component may be about 30 to about 60 and the second about 0 to about 30 weight percent, preferably about 40 to about 50 and about 20 to about 30 weight percent, respectively, based on the total weight of the resin used. A preferred composition for use as the casting resin is about 30 to about 80 weight percent of ethoxylated bisphenol A diacrylate (preferably about 40 to about 50 weight percent of about 3 mole and about 20 to about 30 weight percent of about 10 mole) and about 24 to about 50 weight percent of 2-phenoxyethyl acrylate. A particularly preferred composition is about 75 weight percent of ethoxylated bisphenol A (about 50 weight percent of about 3 mole and about 25 weight percent of about 20 mole) and about 24 weight percent 2-phenoxyethyl acrylate.

In a preferred embodiment, the invention provides a method for producing a lens comprising, consisting essentially of, and consisting of the steps of: a.) exposing a mold assembly and a resin comprising, consisting essentially of, and consisting of about 30 to about 80 weight percent of ethoxylated bisphenol A diacrylate and about 24 to about 50 weight percent of 2-phenoxyethyl acrylate to low intensity UV light under conditions suitable to convert at least about 50 percent or more of the resin's reactive groups; and b.) exposing, subsequently, the resin to high intensity UV light under conditions suitable to complete through curing of the resin.

The viscosity of the resin may be about 5 to about 500, preferably less than about 300, more preferably about 5 to about 300, most preferably about 5 to about 100 centipoise measured at 25° C. with a Brookfield viscometer. It is another discovery of the invention that it is possible to obtain a suitable resin with both a high refractive index and a viscosity of less than about 300 cp. One ordinarily skilled in the art will recognize that the weight percentages of the mono- and polyfunctional monomers must be controlled so as to achieve the desired viscosity.

Additionally, the glass transition temperature, or Tg, of the cured resin used preferably is greater than about 45° C. One ordinarily skilled in the art will recognize that the Tg of the cured resin should not differ significantly, preferably not by more than about 1 to about 10° C. from that of the material used to form the optical preform. Preferably, the Tg of the cured resin and optical preform material are substantially the same. Further, one ordinarily skilled in the art will recognize that the desired cured resin Tg is achievable by selection of monomers and their concentrations.

The monomers selected may have about 0.04 to about 1.17, preferably about 0.15 to about 1.2 equivalents of reactive groups per 100 g resin. Preferably, the monomers used contain about 0.4 to about 0.6 reactive group equivalents per 100 g resin. The amount of resin cast-will be an amount effective to form a surface, which amount will depend on the resin selected, the parameters of the surface desired to be formed, and the size and shape of the surface on which the resin will be cast. Typically, the amount of resin used will be about 2 to about 20 g.

Photoinitiators useful in the invention are those capable of initiating polymerization of the cast resin in the UV absorption spectrum selected. Suitable initiators include, without limitation, free-radical generating photoinitiators, photocationic initiators, photobase initiators, and mixtures thereof. Suitable free-radical generating initiators include, without limitation, methyl benzoyl formate, aromatic ketones including, without limitation, 2-hydroxy-2-methyl-1-phenyl-5 propan-1-one, 1-hydroxycyclohexylphenylketone, 2,2-di-secbutoxyacetophenone, 2,2-diethoxyacetophenone, 2,2-diethoxy-2-phenyl-acetophenone, 2,2-dimethoxy-2-phenyl-acetophenone, benzoin methyl ether, benzoin isobutyl ether, benzoin, benzil, benzil dimethyl ketal, benzyl disulfide, 2,2-dihydroxybenzophenone, benzylideneacteophenone, benozphenone, and acetophenone, 2,4,6-trimethylbenzoyldiphenoylphosphine oxide, and the like, and combinations thereof. Suitable free-radical generating initiators are commercially available or methods for their production known.

Exemplary photocationic initiators include, without limitation, triarylsulfonium salts, such as triphenylsulfonium hexafluoroantimonate and triphenylsulfonium hexafluorophospate, diarylodonium salts such as di-(4-dodecylphenyl)iodonium hexafluorophosphate, aryl diazonium salts, and the like and combinations thereof. Suitable photocationic initiators are commercially available or methods for their production are known.

Exemplary photobase initiators include, without limitation, ortho-nitrobenzyl carbamates such as 4,5-dimethoxy-2-nitrobenzyl carbamate, N-{[4,5-dimethoxy-2-nitrobenzyl)oxy]-carbonyl-2,6-dimethylpiperidine}, 3,5,-dimethoxy-α, α-dimethylbenzyl carbamates, benzoin carbamates such as 3,3',5,5'-dimethoxy benzoin carbamate, o-acyloximes, ammonium salts of α-ketocarboxylic acids, such as dimethyl benzyl ammonium phenylglyoxylate, cobalt (III) alkylamine complexes such as trans-[Co(pyridine)$_4$Cl$_2$]Cl, and the like, and combinations thereof. Methods for their production are disclosed in: 1.) Cameron, J. F. and J. M. Frechet, 113 *J. Am. Chem. Soc.*, 4303–4313 (1991); 2.) Cameron, J. F. and J. M. Frechet, 55 *J. Org. Chem.*, 5919–5922 (1990); and 3.) Weit, S. K., C. Kutal, and R. D. Allen, 4 *Chem. Mater.*, 453–457 (1992).

The amount of initiator used will depend on the type of initiator selected as well as the resin formulation used. Typically, the amount of initiator will be an amount effective to initiate polymerization, about 0.1 to about 5 weight percent based on the weight of the resin formulation, preferably about 0.1 to about 1 weight percent. In addition to a suitable initiator, the resin of the invention may include any desired additive, including without limitation, crosslinkers, viscosity control agents, and the like, and combinations thereof.

One ordinarily skilled in the art will recognize that the curing of the resin may be carried out by curing methods in addition to the preferred UV light cure of the invention. For example, thermal, microwave, and infra-red radiation curing may be used alone or in combination with UV curing.

Casting of the resin onto the preform to form a surface or surfaces may be accomplished by any known method. Suitable methods, for casting one or more surfaces of a preform are disclosed in U.S. Pat. Nos. 5,147,585, 5,178,800, 5,219,497, 5,316,702, 5,358,672, 5,480,600, 5,512,371, 5,531,940, 5,702,819, 5,793,465, 5,859,685, 5,861,934, and 5,907,386 incorporated herein in their entireties by reference.

In general, the resin is dispensed into the mold assembly using any convenient means, such as by the use of a displacement pump. Preferably, the mold assembly is formed of one mold half and an optical preform, the preform acting as the second mold half. The resin may be dispensed so as to form, when cured, one or both of a convex and concave surface, preferably a convex surface, on the preform. Preferably, the mold half is positioned, the resin is dispensed onto a surface of the mold half and the preform is then contacted with the resin by placing the preform on the resin. Once the mold half and preform are positioned as desired, additional resin may be dispensed into the mold assembly to ensure the elimination of air bubbles and voids.

Preferably, the mold half or halves used are of a greater diameter than that of the optical preform. This permits containment of the resin without the use of a gasket, sealing ring, or similar equipment. In those cases in which the curve radius of the preform surface in contact with the resin and mold half is less than that of the mold half, the use of a spacing means may be necessary. By "spacing means" is meant any equipment suitable for use in maintaining the desired distance between the mold half surface and the optical preform surface in contact with the resin. Exemplary equipment for use as spacing means include, without limitation, tapes, gaskets, O-rings, and the like.

Once the curing of the resin is completed, the mold assembly is disassembled to separate the lens from the mold half or halves. Any convenient means may be used for separating the lens from the mold assembly including, without limitation, mechanical separation, thermal separation, and the like, and combinations thereof. It is a further discovery of the invention that disassembly may be achieved by using a water bath and ultrasound. More specifically, separation of the lens, including the cast surface, from the mold is achieved by using ultrasound in the range of about 25 to about 150, preferably 40 to about 50 Khertz induced into a container filled or partially filled with water. The water temperature used will depend on the temperature of the mold assembly; the higher the mold assembly temperature, the higher the water temperature used. Typically, the water temperature will be about room temperature to about −5° C.

Optionally, and preferably, following disassembly of the mold assembly, the lens is heated for a time and at a temperature suitable to relieve stresses resulting from the polymerization process. Heating may be carried out by any convenient method including, without limitation, using thermal, infrared, or microwave energy or combinations thereof. Preferably, the lens is heated using thermal energy for about 1 to about 30, preferably about 5 to about 15 mins at a temperature of about 50 to about 125, preferably about 80 to about 110° C.

One ordinarily skilled in the art will recognize that any type of lens including, without limitation, singlevision, flat-top, multifocal including, without limitation, bifocal, trifocal, progressive, or the like, may be produced using the method of the invention. However, the invention may find greatest utility in the production of progressive addition lenses using surface casting. In embodiments in which the desired final lens is a bifocal, the preform, the added layer, or both must provide near vision power in addition to distance power. For embodiments in which the final lens is a progressive addition lens, the preform, cast layer, or both must provide near vision power, distance power and a zone of transition power between the distance and near vision power zones. For example, a surface of the preform or the cast layer may form a progressive addition surface thus providing a progressive addition lens as the final lens. By "progressive addition surface" is meant a continuous, aspheric surface having distance and near vision zones and a zone of transition power, or zone of increasing dioptric power, connecting the distance and near vision zones.

The invention will be clarified by considering the following, non-limiting examples.

EXAMPLES

Examples 1–65

The following procedure was used to form lenses using the process of the invention. A pre-weighed amount of a casting resin was dispensed onto the concave side of a glass mold that was 81 mm diameter. A 70 mm polycarbonate optical preform was placed on the resin and additional resin is.dispensed, using a pipette, to ensure that no air bubbles or voids are present between the glass mold and preform.

The UV light source was positioned below the glass mold. For examples 1 through 33, the resin was then exposed to UV light of an intensity of approximately 2.7 mW/cm$^2$ and about 300 nm for 2 minutes and, subsequently of an intensity of approximately 250 mW/cm$^2$ and 100 nm for 6 secs. For example 34, the resin was exposed to no low intensity UV light, but light only of an intensity of approximately 358 mW/cm$^2$ and about 300 nm for 15 secs. For example 42, the resin was exposed to UV light of an intensity of approximately 2.7 mW/cm$^2$ and about 300 nm for 45 secs and, subsequently, of an intensity of approximately about 1130 mW/cm and 300 nm for 6 secs. For examples 43 through 53, the resin was exposed to low intensity UV light of 2.7 mW/cm2 for 120 secs and then exposed to UV light of an intensity of approximately 358 mW/cm$^2$ for 15 secs. For examples 59–62, the resin was exposed to low intensity UV light of 2.7 mW/cm$^2$ for 45 secs on, 30 secs off, and 45 secs on. Subsequently, the resin was exposed to UV light of 1130 mW/cm$^2$ for 6 secs. The lens formed from the resin and preform was removed from the mold using ultrasound demolding and baked for 10 min at 100° in a convection oven.

The specific casting resins and data are provided on the following tables. Abbreviations used in the tables are as follows:

ACTILANE™ 320: epoxy acrylate
CD™-9038: ethoxylated bisphenol A diacrylate (30 mole)
CN™-104: epoxy diacrylate approximately 1 mole
EBECRYL™-110: ethoxylated phenoxy ethyl acrylate
EBECRYL™-3700: epoxy diacrylate (approximately 1 mole)
EBECRYL™-3720: bisphenol A diacrylate
IRG 184: 1-hydroxy cyclohexyl phenyl ketone
LUCIRIN™ TPO-L: ethyl 2,4,6-trimethylbenzoylphenyl phosphinate
PHOTOMER™-3016: epoxy diacrylate (1 mole)
SR™-339: 2-pehnoxyethyl acrylate
SR™-344: Polyethylene glycol 400 diacrylate
SR™-349: ethoxylated bisphenol A diacrylate (3 mole)
SR™-506: isobornyl acrylate
SR™-601: ethoxylated bisphenol A diacrylate (4 mole)
SR™-602: ethoxylated bisphenol A diacrylate (10 mole)

Percentages are in weight percent of the total resin composition.

TABLE 1

|  | Example 1 | Example 2 | Example 3 | Example 4 | Example 5 | Example 6 |
| --- | --- | --- | --- | --- | --- | --- |
| Resin | SR ™-339 (40%) | — | SR ™-339 (10%) | SR ™-339 (9%) | — | — |
|  | SR ™-506 (40%) | SR ™-506 (70%) | SR ™-506 (70%) | SR ™-506 (40%) | SR ™-506 (49%) | SR ™-506 (59.5%) |
|  | SR ™-601 (19%) | SR ™-601 (29%) | SR ™-601 (19%) | SR ™-601 (50%) | SR ™-601 (50%) | SR ™-601 (39.5%) |
|  | IRG 184 (1%) | IRG 184 (1%) | IRG 184 (1%) | IRG 184 (1%) | IRG 184 (1%) | IRG 184 (1%) |
| DSC Data | Tmax (min) = 0.45 | Tmax (min) = 0.42 | Tmax (min) = 0.44 | Tmax (min) = 0.42 | Tmax (min) = 0.39 | Tmax (min) = 0.41 |
|  | % Conversion @ Tmax = 34.29 | % Conversion @ Tmax = 40.98 | % Conversion @ Tmax = 39.78 | % Conversion @ Tmax = 38.04 | % Conversion @ Tmax = 38.26 | % Conversion @ Tmax = 38.86 |
|  | Enthalpy (cal/g) = 84.95 | Enthalpy (cal/g) = 68.62 | Enthalpy (cal/g) = 73.52 | Enthalpy (cal/g) = 66.19 | Enthalpy (cal/g) = 61.36 | Enthalpy (cal/g) = 65.65 |
| Refractive Index (uncured) @ 20° C. | 1.50 | 1.49 | 1.49 | 1.51 | 1.50 | 1.50 |

TABLE 2

|  | Example 7 | Example 8 | Example 9 | Example 10 | Example 11 |
| --- | --- | --- | --- | --- | --- |
| Resin | SR ™-339 (24.5%) SR ™-506 (40%) SR ™-601 (34.5%) IRG 184 (1%) | SR ™-339 (5%) SR ™-506 (70%) SR ™-601 (24%) IRG 184 (1%) | SR ™-339 (25%) SR ™-506 (55%) SR ™-601 (19%) IRG 184 (1%) | SR ™-339 (4.5%) SR ™-506 (44.5%) SR ™-601 (50%) IRG 184 (1%) | SR ™-339 (11.8%) SR ™-506 (53.8%) SR ™-601 (33.4%) IRG 184 (1%) |
| DSC Data | Tmax (min) = 0.44 % Conversion @ Tmax = 37.54 Enthalpy (cal/g) = 75.26 | Tmax (min) = 0.44 % Conversion @ Tmax = 39.96 Enthalpy (cal/g) = 70.66 | Tmax (min) = 0.46 % Conversion @ Tmax = 38.33 Enthalpy (cal/g) = 80.85 | Tmax (min) = 0.40 % Conversion @ Tmax = 38.61 Enthalpy (cal/g) = 66.95 | Tmax (min) = 0.42 % Conversion @ Tmax = 39.30 Enthalpy (cal/g) = 72.48 |
| Refractive Index (uncured) @ 20° C. | 1.51 | 1.49 | 1.50 | 1.51 | 1.50 |

TABLE 3

|  | Example 12 | Example 13 | Example 14 | Example 15 | Example 16 | Example 17 |
| --- | --- | --- | --- | --- | --- | --- |
| Resin | SR ™-349 (50%) SR ™-506 (35%) SR ™-344 (10%) — Divinyl Benzene (4%) IRG 184 (1%) | SR ™-349 (40%) SR ™-506 (45%) SR ™-344 (10%) — Divinyl Benzene (4%) IRG 184 (1%) | SR ™-349 (50%) SR ™-506 (45%) — — Divinyl Benzene (4%) IRG 184 (1%) | SR ™-349 (50%) SR ™-506 (40%) SR ™-344 (5%) — Divinyl Benzene (4%) IRG 184 (1%) | SR ™-349 (50%) SR ™-506 (20%) SR ™-344 (10%) SR ™-339 (15%) Divinyl Benzene (4%) IRG 184 (1%) | SR ™-349 (50%) SR ™-506 (10%) SR ™-344 (10%) SR ™-339 (25%) Divinyl Benzene (4%) IRG 184 (1%) |
| Viscosity (cps @ 25° C.) | 71.05 | 42.35 | 55.45 | 62.75 | — | — |
| DSC Data | Tmax (min) = 3.02 % Conversion @ Tmax = 54.06 Enthalpy (cal/g) = 45.85 | Tmax (min) = 3.66 % Conversion @ Tmax = 52.58 Enthalpy (cal/g) = 71.68 | Tmax (min) = 3.21 % Conversion @ Tmax = 8.2 Enthalpy (cal/g) = 65.58 | Tmax (min) = 3.09 % Conversion @ Tmax = 52.38 Enthalpy (cal/g) = 69.00 | Tmax (min) = 2.95 % Conversion @ Tmax = 58.02 Enthalpy (cal/g) = 62.18 | Tmax (min) = 2.79 % Conversion @ Tmax = 57.1 Enthalpy (cal/g) = 69.36 |
| Refractive Index (uncured) @ 20° C. | 1.51 | 1.51 | 1.52 | 1.51 | 1.52 | 1.53 |

TABLE 4

|  | Example 18 | Example 19 | Example 20 | Example 21 | Example 22 |
| --- | --- | --- | --- | --- | --- |
| Resin | SR ™-602 (20%) SR ™-349 (20%) CD ™-9038 (9%) ACTILANE ™ 320 (50%) IRG 184 (1%) | SR ™-602 (10%) SR ™-349 (20%) CD ™-9038 (9%) ACTILANE ™ 320 (60%) IRG 184 (1%) | SR ™-602 (20%) SR ™-349 (10%) CD ™-9038 (9%) ACTILANE ™ 320 (60%) IRG 184 (1%) | SR ™-602 (30%) SR ™-349 (30%) CD ™-9038 (9%) ACTILANE ™ 320 (30%) IRG 184 (1%) | SR ™-602 (20%) SR ™-349 (50%) CD ™-9038 (9%) ACTILANE ™ 320 (20%) IRG 184 (1%) |
| Viscosity (cps) | 12417 (25° C.) 1378 (45° C.) | 28014 (25° C.) 2426 (45° C.) | 19366 (25° C.) 1892 (45° C.) | 3979 (25° C.) 578.2 (45° C.) | 2954 (25° C.) 452 (45° C.) |
| DSC Data | Tmax (min) = 0.67 % Conversion | Tmax (min) = 1.05 % Conversion | Tmax (min) = 0.81 % Conversion | Tmax (min) = 0.53 % Conversion | Tmax (min) = 0.49 % Conversion |

TABLE 4-continued

|  | Example 18 | Example 19 | Example 20 | Example 21 | Example 22 |
| --- | --- | --- | --- | --- | --- |
|  | @ Tmax = 41.16 Enthalpy (cal/g) = 39.41 | @ Tmax = 49.26 Enthalpy (cal/g) = 37.41 | @ Tmax = 45.87 Enthalpy (cal/g) = 37.91 | @ Tmax = 39.27 Enthalpy (cal/g) = 42.53 | @ Tmax = 38.08 Enthalpy (cal/g) = 45.12 |
| Refractive Index (uncured) @ 20° C. | 1.54 | 1.55 | 1.54 | 1.54 | 1.54 |
| Mechanical Properties | 2038 Mpa @ 25° C. 71.74 Tg (° C.) 0.45 Tan δ @ Tg | 2218 Mpa @ 25° C. 75.25 Tg (° C.) 0.47 Tan δ @ Tg | 1929 Mpa @ 25° C. 71.59 Tg (° C.) 0.44 Tan δ @ Tg | 1596 Mpa @ 25° C. 60.26 Tg (° C.) 0.43 Tan δ @ Tg | 1172 Mpa @ 25° C. 61.22 Tg (° C.) 0.48 Tan δ @ Tg |

TABLE 5

|  | Example 23 | Example 24 | Example 25 | Example 26 | Example 27 | Example 28 |
| --- | --- | --- | --- | --- | --- | --- |
| Resin | SR ™-349 (50%) SR ™-506 (20%) SR ™-344 (10%) — Divinyl Benzene (4%) ACTILANE ™ 320 (15%) IRG 184 (1%) | SR ™-349 (50%) SR ™-506 (10%) SR ™-344 (10%) — Divinyl Benzene (4%) ACTILANE ™ 320 (25%) IRG 184 (1%) | SR ™-349 (60%) SR ™-506 (20%) SR ™-344 (10%) — Divinyl Benzene (4%) ACTILANE ™ 320 (5%) IRG 184 (1%) | SR ™-349 (20%) SR ™-602 (10%) CD ™-9038 (9%) — — ACTILANE ™ 320 (60%) LUCIRIN ™ TPO-L (1%) | SR ™-349 (20%) SR ™-602 (10%) CD ™-9038 (9%) EBECRYL ™ 3700 (60%) — — LUCIRIN ™ TPO-L (1%) | SR ™-349 (20%) SR ™-602 (10%) CD ™-9038 (5%) EBECRYL ™ 3700 (60%) Divinyl Benzene (4%) — LUCIRIN ™ TPO-L (1%) |
| DSC Data | Tmax (min) = 2.04 % Conversion @ Tmax = 55.08 Enthalpy (cal/g) = 51.58 | Tmax (min) = 1.51 % Conversion @ Tmax = 53.11 Enthalpy (cal/g) = 49.12 | Tmax (min) = 2.23 % Conversion @ Tmax = 57.45 Enthalpy (cal/g) = 54.77 | Tmax (min) = 0.58 % Conversion @ Tmax = 32.59 Enthalpy (cal/g) = 33.95 | Tmax (min) = 0.66 % Conversion @ Tmax = 29.21 Enthalpy (cal/g) = 35.73 | Tmax (min) = 1.09 % Conversion @ Tmax = 37.93 Enthalpy (cal/g) = 37.68 |
| Refractive Index (uncured) @ 20° C. | 1.53 | 1.54 | 1.53 | 1.54 | 1.55 | 1.55 |
| Viscosity | — | — | — | 26469 (25° C.) 6454 (35° C.) 2465 (45° C.) 953 (55° C.) 448 (65° C.) | 22639 (25° C.) 6169 (35° C.) 2028 (45° C.) 824 (55° C.) 401 (65° C.) | 9633 (25° C.) 2916 (35° C.) 1076 (45° C.) 463 (55° C.) 215 (65° C.) |

TABLE 6

|  | Example 29 | Example 30 | Example 31 |
| --- | --- | --- | --- |
| Resin | SR ™-602 (20%) SR ™-349 (20%) CD ™ 9038 (9%) EBECRYL ™ 3700 (50%) IRG 184 (1%) | SR ™-602 (10%) SR ™-349 (20%) CD ™ 9038 (9%) EBECRYL ™ 3700 (60%) IRG 184 (1%) | SR ™-602 (30%) SR ™-349 (30%) CD ™ 9038 (9%) EBECRYL ™ 3700 (30%) IRG 184 (1%) |
| DSC Data | Tmax (min) = 6.1 | Tmax (min) = 6.29 | Tmax (min) = 5.84 |
|  | % Conversion @ Tmax = 45.74 Enthalpy (cal/g) = 40.84 | % Conversion @ Tmax = 46.61 Enthalpy (cal/g) = 35.99 | % Conversion @ Tmax = 45.6 Enthalpy (cal/g) = 45.2 |
| Refractive Index (uncured) @ 20° C. | 1.54 | 1.55 | 1.54 |

TABLE 7

|  | Example 32 | Example 33 | Example 34 | Example 35 | Example 36 |
| --- | --- | --- | --- | --- | --- |
| Resin | SR ™-349 (75%) SR ™-339 (24%) IRG 184 (1%) | SR ™-349 (66%) SR ™-339 (33%) IRG 184 (1%) | SR ™-349 (50%) SR ™-339 (49%) IRG 184 (1%) | SR ™-349 (33%) SR ™-339 (66%) IRG 184 (1%) | SR ™-349 (24%) SR ™-339 (75%) IRG 184 (1%) |
| Viscosity (cps) | 282.4 (25° C.) | 160.9 (25° C.) | 67.85 (25° C.) | 31.7 (25° C.) | 22.35 (25° C.) |
| DSC Data | Tmax (min) = 0.44 % Conversion @ Tmax = 36.61 Enthalpy (cal/g) = 61.13 | Tmax (min) = 0.44 % Conversion @ Tmax = 34.11 Enthalpy (cal/g) = 63.69 | Tmax (min) = 0.38 % Conversion @ Tmax = 35.8 Enthalpy (cal/g) = 73.66 | Tmax (min) = 0.4_ % Conversion @ Tmax = 34.76 Enthalpy (cal/g) = 83.43 | Tmax (min) = 0.38 % Conversion @ Tmax = 36.77 Enthalpy (cal/g) = 88.58 |
| Refractive Index (uncured) @ 20° C. | 1.54 | 1.54 | 1.53 | 1.53 | 1.53 |
| Mechanical Properties | 2391 Mpa @ 25° C. 62.37 Tg (° C.) 0.79 Tan δ @ Tg | 3120 Mpa @ 25° C. 57.49 Tg (° C.) 0.90 Tan δ @ Tg | 2121 Mpa @ 25° C. 44.37 Tg (° C.) 1.132 Tan δ @ Tg | 597.6 Mpa @ 25° C. 33.74 Tg (° C.) 1.385 Tan δ @ Tg | 248.9 Mpa @ 25° C. 30.48 Tg (° C.) 1.485 Tan δ @ Tg |

TABLE 8

|  | Example 37 | Example 38 | Example 39 | Example 40 | Example 41 | Example 42 |
| --- | --- | --- | --- | --- | --- | --- |
| Resin | SR ™-349 (33%) SR ™-339 (66%) — IRG 184 (1%) | SR ™-349 (33%) SR ™-339 (61%) EBECRYL ™ 3700 (5%) IRG 184 (1%) | SR ™-349 (33%) SR ™-339 (56%) EBECRYL ™ 3700 (10%) IRG 184 (1%) | SR ™-349 (33%) SR ™-339 (51%) EBECRYL ™ 3700 (15%) IRG 184 (1%) | SR ™-349 (33%) SR ™-339 (46%) EBECRYL ™ 3700 (20%) IRG 184 (1%) | SR ™-349 (33%) SR ™-339 (41%) EBECRYL ™ 3700 (25%) IRG 184 (1%) |
| Viscosity (cps) | 31.7 (25° C.) | 46.15 (25° C.) | 62.7 (25° C.) | 81.25 (25° C.) | 151.35 (25° C.) | 237.3 (25° C.) |
| DSC Data | Tmax (min) = 0.4 % Conversion @ Tmax = 34.76 Enthalpy (cal/g) = 83.43 | Tmax (min) = 0.36 % Conversion @ Tmax = 35.64 Enthalpy (cal/g) = 82.53 | Tmax (min) = 0.44 % Conversion @ Tmax = 35.36 Enthalpy (cal/g) = 76.77 | Tmax (min) = 0.5 % Conversion @ Tmax = 36.69 Enthalpy (cal/g) = 80.78 | Tmax (min) = 0.53 % Conversion @ Tmax = 33.41 Enthalpy (cal/g) = 73.12 | Tmax (min) = 0.54 % Conversion @ Tmax = 31.57 Enthalpy (cal/g) = 69.81 |
| Refractive Index (uncured) @ 20° C. | 1.53 | 1.53 | 1.53 | 1.53 | 1.54 | 1.54 |
| Mechanical Properties | 597.6 Mpa @ 25° C. 33.74 Tg (° C.) 1.385 Tan δ @ Tg | 1121 Mpa @ 25° C. 36.79 Tg (° C.) 1.271 Tan δ @ Tg | 2105 Mpa @ 25° C. 45.11 Tg (° C.) 1.076 Tan δ @ Tg | 1850 Mpa @ 25° C. 41.57 Tg (° C.) 1.208 Tan δ @ Tg | 2517 Mpa @ 25° C. 54.21 Tg (° C.) 0.9987 Tan δ @ Tg | 2589 Mpa @ 25° C. 56.93 Tg (° C.) 0.9446 Tan δ @ Tg |

TABLE 9

|  | Example 43 | Example 44 | Example 45 | Example 46 | Example 47 | Example 48 |
| --- | --- | --- | --- | --- | --- | --- |
| Resin | SR ™-349 (45%) SR ™-339 (24%) SR ™-602 (30%) IRG 184 (1%) | SR ™-349 (50%) SR ™-339 (24%) SR ™-602 (25%) IRG 184 (1%) | SR ™-349 (50%) SR ™-339 (49%) — IRG 184 (1%) | SR ™-349 (33%) SR ™-339 (66%) — IRG 184 (1%) | SR ™-349 (36%) SR ™-339 (33%) SR ™-602 (30%) IRG 184 (1%) | SR ™-349 (42%) SR ™-339 (57%) — IRG 184 (1%) |

TABLE 9-continued

|  | Example 43 | Example 44 | Example 45 | Example 46 | Example 47 | Example 48 |
|---|---|---|---|---|---|---|
| Viscosity (cps) | 257.6 (25° C.) | 256.7 (25° C.) | 67.85 (25° C.) | 31.7 (25° C.) | 155.1 (25° C.) | 48.25 (25° C.) |
| DSC Data | Tmax (min) = 0.41 % Conversion @ Tmax = 33.33 Enthalpy (cal/g) = 63.62 | Tmax (min) = 0.52 % Conversion @ Tmax = 36.82 Enthalpy (cal/g) = 63.18 | Tmax (min) = 0.38 % Conversion @ Tmax = 35.8 Enthalpy (cal/g) = 73.66 | Tmax (min) = 0.4 % Conversion @ Tmax = 34.76 Enthalpy (cal/g) = 83.43 | Tmax (min) = 0.5 % Conversion @ Tmax = 36.89 Enthalpy (cal/g) = 69.11 | Tmax (min) = 0.43 % Conversion @ Tmax = 36.77 Enthalpy (cal/g) = 82.41 |
| Refractive Index (uncured) @ 20° C. | 1.53 | 1.53 | 1.53 | 1.53 | 1.53 | 1.53 |
| Mechanical Properties | 1604 Mpa @ 25° C. 43.38 Tg (° C.) 0.7964 Tan δ @ Tg | 1965 Mpa @ 25° C. 46.48 Tg (° C.) 0.7828 Tan δ @ Tg | 2121 Mpa @ 25° C. 44.37 Tg (° C.) 1.132 Tan δ @ Tg | 597.6 Mpa @ 25° C. 33.74 Tg (° C.) 1.385 Tan δ @ Tg | 801 Mpa @ 25° C. 35.32 Tg (° C.) 0.9644 Tan δ @ Tg | 1514 Mpa @ 25° C. 38.36 Tg (° C.) 12.213 Tan δ @ Tg |

TABLE 10

|  | Example 49 | Example 50 | Example 51 | Example 52 | Example 53 |
|---|---|---|---|---|---|
| Resin | SR ™-349 (40.5%) SR ™-339 (28.5%) SR ™-602 (30%) IRG 184 (1%) | SR ™-349 (47.5%) SR ™-339 (24%) SR ™-602 (27.5%) IRG 184 (1%) | SR ™-349 (50%) SR ™-339 (36.5%) SR ™-602 (12.5%) IRG 184 (1%) | SR ™-349 (35%) SR ™-339 (49%) SR ™-602 (15%) IRG 184 (1%) | SR ™-349 (43%) SR ™-339 (39%) SR ™-602 (17%) IRG 184 (1%) |
| Viscosity (cps) | 200.1 (25° C.) | 253.4 (25° C.) | 131.8 (25° C.) | 72.85 (25° C.) | 118.9 (25° C.) |
| DSC Data | Tmax (min) = 0.52 % Conversion @ Tmax = 35.63 Enthalpy (cal/g) = 68.41 | Tmax (min) = 0.52 % Conversion @ Tmax = 33.52 Enthalpy (cal/g) = 62.75 | Tmax (min) = 0.48 % Conversion @ Tmax = 35.89 Enthalpy (cal/g) = 71.04 | Tmax (min) = 0.45 % Conversion @ Tmax = 35.27 Enthalpy (cal/g) = 76.35 | Tmax (min) = 0.47 % Conversion @ Tmax = 37.52 Enthalpy (cal/g) = 7361 |
| Refractive Index (uncured) @ 20° C. | 1.53 | 1.53 | 1.53 | 1.53 | 1.53 |
| Mechanical Properties | 1359 Mpa @ 25° C. 37.96 Tg (° C.) 0.881 Tan δ @ Tg | 1591 Mpa @ 25° C. 44.91 Tg (° C.) 0.7693 Tan δ @ Tg | 2027 Mpa @ 25° C. 44.64 Tg (° C.) 0.9282 Tan δ @ Tg | 721.3 Mpa @ 25° C. 34.04 Tg (° C.) 1.147 Tan δ @ Tg | 1606 Mpa @ 25° C. 39.59 Tg (° C.) 1.001 Tan δ @ Tg |

TABLE 11

|  | Example 54 | Example 55 | Example 56 | Example 57 | Example 58 |
|---|---|---|---|---|---|
| Resin | SR ™-349 (33%) SR ™-339 (61%) Benzyl Acrylate (5%) IRG 184 (1%) | SR ™-349 (33%) SR ™-339 (56%) Benzyl Acrylate (10%) IRG 184 (1%) | SR ™-349 (33%) SR ™-339 (41%) Benzyl Acrylate (25%) IRG 184 (1%) | SR ™-349 (33%) EBECRYL ™ 110 (41%) EBECRYL ™ 600 (25%) IRG 184 (1%) | SR ™-349 (33%) EBECRYL ™ 110 (41%) EBECRYL ™ 3720 (25%) IRG 184 (1%) |
| Viscosity (cps) | 28.45 (25° C.) | 24.95 (25° C.) | 17.60 (25° C.) | 390.4 (25° C.) | 400.6 (25° C.) |
| DSC Data | Tmax (min) = 0.39 % Conversion @ Tmax = | Tmax (min) = 0.41 % Conversion @ Tmax = | Tmax (min) = 0.43 % Conversion @ Tmax = | Tmax (min) = 5.56 % Conversion @ Tmax = | Tmax (min) = 5.59 % Conversion @ Tmax = |

TABLE 11-continued

|  | Example 54 | Example 55 | Example 56 | Example 57 | Example 58 |
|---|---|---|---|---|---|
|  | 37.62 Enthalpy (cal/g) = 82.00 | 35.79 Enthalpy (cal/g) = 82.94 | 36.81 Enthalpy (cal/g) = 88.11 | 35.08 Enthalpy (cal/g) = 62.13 | 33.74 Enthalpy (cal/g) = 58.56 |
| Refractive Index (uncured) @ 20° C. | 1.53 | 1.53 | 1.53 | 1.53 | 1.53 |
| Mechanical Properties | 758.9 Mpa @ 25° C. 33.98 Tg (° C.) 1.466 Tan δ @ Tg | 857.8 Mpa @ 25° C. 35.26 Tg (° C.) 1.382 Tan δ @ Tg | 1071 Mpa @ 25° C. 36.5 Tg (° C.) 1.427 Tan δ @ Tg | 1669 Mpa @ 25° C. 44.99 Tg (° C.) 0.7199 Tan δ @ Tg | 1479 Mpa @ 25° C. 43.00 Tg (° C.) 0.7288 Tan δ @ Tg |

TABLE 12

|  | Example 59 | Example 60 | Example 61 | Example 62 | Example 63 | Example 64 | Example 65 |
|---|---|---|---|---|---|---|---|
| Resin | SR ™-349 (33%) SR ™-339 (31%) EBECRYL ™ 3700 (25%) SR ™-506 (10%) IRG 184 (1%) | SR ™-349 (33%) SR ™-339 (26%) EBECRYL ™ 3700 (25%) SR ™-506 (15%) IRG 184 (1%) | SR ™-349 (33%) SR ™-339 (21%) EBECRYL ™ 3700 (25%) SR ™-506 (20%) IRG 184 (1%) | SR ™-349 (33%) SR ™-339 (16%) EBECRYL ™ 3700 (25%) SR ™-506 (25%) IRG 184 (1%) | SR ™-349 (50%) SR ™-339 (14%) SR ™-602 (25%) SR ™-506 (10%) IRG 184 (1%) | SR ™-349 (50%) SR ™-339 (9%) SR ™-602 (25%) SR ™-506 (15%) IRG 184 (1%) | SR ™-349 (50%) SR ™-339 (4%) SR ™-602 (25%) SR ™-506 (20%) IRG 184 (1%) |
| Viscosity (cps) | — (25° C.) | — (25° C.) | 226.1 (25° C.) | 236.9 (25° C.) | — (25° C.) | — (25° C.) | 246.6 (25° C.) |
| DCS Data | Tmax (min) = — % Conversion @ Tmax = — Enthalpy (cal/g) = — | Tmax (min) = — % Conversion @ Tmax = — Enthalpy (cal/g) = — | Tmax (min) = 5.54 % Conversion @ Tmax = 37.36 Enthalpy (cal/g) = 62.53 | Tmax (min) = 5.54 % Conversion @ Tmax = 35.97 Enthalpy (cal/g) = 62.06 | Tmax (min) = — % Conversion @ Tmax = — Enthalpy (cal/g) = — | Tmax (min) = — % Conversion @ Tmax = — Enthalpy (cal/g) = — | Tmax (min) = 5.38 % Conversion @ Tmax = 32.68 Enthalpy (cal/g) = 56.31 |
| Refractive Index (uncured) @ 20° C. | 1.53 | 1.53 | 1.53 | 1.52 | 1.53 | 1.52 | 1.52 |
| Mechanical Properties | 2691 Mpa @ 25° C. 63.12 Tg(° C.) 0.9088 Tan δ @ Tg | 2021 Mpa @ 25° C. 66.84 Tg(° C.) 0.9136 Tan δ @ Tg | 2345 Mpa @ 25° C. 70.14 Tg(° C.) 0.9145 Tan δ @ Tg | 2459 Mpa @ 25° C. 72.2 Tg(° C.) 0.8909 Tan δ @ Tg | 392.5 Mpa @ 25° C. 31.33 Tg(° C.) 0.7500 Tan δ @ Tg | 730.1 Mpa @ 25° C. 38.07 Tg(° C.) 0.9704 Tan δ @ Tg | 1943 Mpa @ 25° C. 71.66 Tg(° C.) 0.6319 Tan δ @ Tg |

What is claimed is:

1. A method for producing spectacle lenses comprising the steps of: a.) exposing to low intensity ultraviolet light a mold assembly comprising a mold half and an optical preform and a surface-forming effective amount of a resin comprising reactive groups, the low intensity WV light exposure carried out under conditions suitable to convert at least about 50 percent or more of the resin reactive groups; and b.) exposing, subsequently, the resin to high intensity UV light under conditions suitable to substantially complete through curing of the resin and lens formation, wherein the low intensity ultraviolet light is about 1 to about 5 mW/cm$^2$ at about 300 to about 450 nm and the high intensity ultraviolet light is about 500 to about 1500 mW/cm$^2$ at about 300 to about 450 nm.

2. The method of claim 1, wherein steps a.) and b.) are carried out at about the Tg of the cured resin.

3. The method of claim 1, further comprising, prior to step a.), heating the resin to about the cured resin's Tg.

4. The method of claim 2, wherein the low intensity exposure is for about 5 to about 300 seconds and the high intensity exposure is for about 3 to about 60 seconds.

5. The method of claim 4, wherein the total ultraviolet light exposure time is about 130 seconds or less.

6. The method of claim 4, wherein the low intensity exposure is carried out by alternating periods of exposure of about 30 to about 60 seconds with periods of non-exposure of about 5 to about 60 seconds.

7. The method of claim 6, wherein the total ultraviolet light exposure time is about 130 seconds or less.

8. The method of claim 2, wherein the reactive groups are present in a concentration amount of about 0.04 to about 1.17 equivalents of reactive groups per 100 g resin.

9. The method of claim 8, wherein the reactive groups are free-radical polymerizable reactive groups.

10. The method of claim 9, wherein the resin further comprises about 30 to about 80 weight percent of an ethoxylated bisphenol A diacrylate and about 24 to about 50 weight percent of a phenoxyethyl acrylate.

11. The method of claim 10, wherein the resin comprises about 75 weight percent of ethoxylated bisphenol A comprising about 50 weight percent of about 3 mole and about 25 weight percent of about 20 mole ethoxylated bisphenol A and about 24 weight percent 2-phenoxyethyl acrylate.

12. The method of claim 1 or 2, further comprising the step c.) using, subsequent to step b.), ultrasound in the range of about 25 to about 150 Khertz to separate the lens from the mold assembly.

13. The method of claim 1 or 2, further comprising the step of heating, subsequent to step b.), the lens using thermal energy for about 1 to about 30 mins at a temperature of about 50 to about 125° C.

14. The method of claim 12, further comprising the step of heating, subsequent to step c.), the lens using thermal energy for about 1 to about 30 mins at a temperature of about 50 to about 125° C.

15. A method for producing spectacle lenses comprising the steps of: a.) exposing to low intensity ultraviolet light of about 1 to about 5 mW/cm$^2$ at about 300 to about 450 nm a mold assembly comprising at least one mold half and an optical preform and a surface-forming effective amount of a resin comprising free-radical polymerizable reactive groups in a concentration amount of about 0.04 to about 1.17 equivalents of reactive groups per 100 g resin, the low intensity UV light exposure carried out under conditions suitable to convert at least about 50 percent or more of the resin reactive groups; and b.) exposing, subsequently, the mold assembly and resin to high intensity UV light of about 500 to about 1500 mW/cm$^2$ at about 300 to about 450 nm under conditions suitable to substantially complete through curing of the resin and lens formation, wherein steps a.) and b.) are carried out at about the Tg of the cured resin.

16. The method of claim 15, further comprising, prior to step a.), heating the resin to about the cured resin's Tg.

17. The method of claim 15 or 16, wherein the low intensity exposure is for about 5 to about 300 seconds and the high intensity exposure is for about 3 to about 60 seconds.

18. The method of claim 17, wherein the total ultraviolet light exposure time is about 130 seconds or less.

19. The method of claim 15 or 16, wherein the resin further comprises about 30 to about 80 weight percent of an ethoxylated bisphenol A diacrylate and about 24 to about 50 weight percent of a phenoxyethyl acrylate.

20. The method of claim 19, wherein the resin comprises about 75 weight percent of ethoxylated bisphenol A comprising about 50 weight percent of about 3 mole and about 25 weight percent of about 20 mole ethoxylated bisphenol A and about 24 weight percent 2-phenoxyethyl acrylate.

21. The method of claim 15 or 16, further comprising the step c.) using, subsequent to step b.), ultrasound in the range of about 25 to about 150 Khertz to separate the lens from the mold assembly.

22. The method of claim 15 or 16, further comprising the step of heating, subsequent to step b.), the lens using thermal energy for about 1 to about 30 mins at a temperature of about 50 to about 125° C.

23. The method of claim 21, further comprising the step of heating, subsequent to step c.), the lens using thermal energy for about 1 to about 30 mins at a temperature of about 50 to about 125° C.

24. A method for producing spectacle lenses comprising the steps of: a.) exposing to low intensity ultraviolet light of about 1 to about 5 mW/cm$^2$ at about 300 to about 450 nm a mold assembly comprising at least one mold half and an optical preform and a surface-forming effective amount of a resin comprising free-radical polymerizable reactive groups in a concentration amount of about 0.04 to about 1.17 equivalents of reactive groups per 100 g resin and having a viscosity of less than about 300 cp at 25° C., the low intensity UV light exposure carried out under conditions suitable to convert at least about 50 percent or more of the resin reactive groups; and b.) exposing, subsequently, the mold assembly and resin to high intensity U V light of about 500 to about 1500 mW/cm$^2$ at about 300 to about 450 nm under conditions suitable to substantially complete through curing of the resin and lens formation, wherein steps a.) and b.) are carried out at about the Tg of the cured resin.

25. The method of claim 24, wherein the viscosity of the resin about 5 to about 100 cp at 25° C.

26. The method of claim 24, further comprising, prior to step a.), heating the resin to about the cured resin's Tg.

27. The method of claim 24, wherein the total ultraviolet light exposure time is about 130 seconds or less.

28. The method of claim 24, wherein the resin comprises about 75 weight percent of ethoxylated bisphenol A comprising about 50 weight percent of about 3 mole and about 25 weight percent of about 20 mole ethoxylated bisphenol A and about 24 weight percent 2-phenoxyethyl acrylate.

29. The method of claim 24, further comprising the step c.) using, subsequent to step b.), ultrasound in the range of about 25 to about 150 Khertz to separate the lens from the mold assembly.

30. The method of claim 24, further comprising the step of heating, subsequent to step b.) the lens using thermal energy for about 1 to about 30 mins at a temperature of about 50 to about 125° C.

\* \* \* \* \*

UNITED STATES PATENT AND TRADEMARK OFFICE
CERTIFICATE OF CORRECTION

PATENT NO. : 6,630,083 B1
DATED : October 7, 2003
INVENTOR(S) : Ivan Nunez et al.

It is certified that error appears in the above-identified patent and that said Letters Patent is hereby corrected as shown below:

Column 17,
Line 51, replace "WV" with -- UV --

Column 19,
Line 37, replace "the resin" with -- the casting resin --

Signed and Sealed this

Thirtieth Day of December, 2003

JAMES E. ROGAN
*Director of the United States Patent and Trademark Office*